United States Patent
Nakatani

(10) Patent No.: US 7,967,259 B2
(45) Date of Patent: Jun. 28, 2011

(54) EXTENSION DEVICE AND TRIPOD

(75) Inventor: Koichiro Nakatani, Tokyo (JP)

(73) Assignee: Velbon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/295,676

(22) PCT Filed: Mar. 18, 2008

(86) PCT No.: PCT/JP2008/054923
§ 371 (c)(1),
(2), (4) Date: Oct. 1, 2008

(87) PCT Pub. No.: WO2008/114783
PCT Pub. Date: Sep. 25, 2008

(65) Prior Publication Data
US 2009/0095856 A1   Apr. 16, 2009

(30) Foreign Application Priority Data
Mar. 19, 2007   (JP) .................................. 2007-070475

(51) Int. Cl.
*A47F 7/00*     (2006.01)
*F16M 11/00*    (2006.01)
*F16M 13/00*    (2006.01)

(52) U.S. Cl. ..................... 248/125.8; 248/161; 248/407; 248/408; 403/109.1; 403/109.3

(58) Field of Classification Search ............... 248/125.8, 248/161, 407, 408, 409; 403/109.1, 109.3
See application file for complete search history.

(56) References Cited

U.S. PATENT DOCUMENTS

| | | | |
|---|---|---|---|
| 2,229,476 A | | 1/1941 | Redmon |
| 3,456,662 A | * | 7/1969 | Weber .............................. 135/26 |
| 5,287,869 A | | 2/1994 | Wu |
| 6,467,747 B1 | * | 10/2002 | Ellsworth ...................... 248/548 |
| 2003/0015641 A1 | | 1/2003 | Conrad |
| 2006/0175484 A1 | * | 8/2006 | Wood et al. ................. 248/177.1 |
| 2007/0031184 A1 | * | 2/2007 | Baxstrom ................... 403/109.3 |

FOREIGN PATENT DOCUMENTS

| | | |
|---|---|---|
| CN | 2246413 Y | 2/1997 |
| CN | 2817546 Y | 9/2006 |
| DE | 20021647 U1 | 5/2002 |
| FR | 378021 A1 | 7/1907 |
| JP | 43-018535 Y1 | 7/1968 |

(Continued)

OTHER PUBLICATIONS

A catalog for Velbon Kabushiki Kaisha, retrieved on Feb. 28, 2007, http://www.velbon.com/jp/catalog/classig/t100.html> (URL no longer exists).

(Continued)

*Primary Examiner* — Amy J Sterling
(74) *Attorney, Agent, or Firm* — McDermott Will & Emery LLP

(57) ABSTRACT

An extension device includes the first tubular member, the second tubular member movably inserted into the first tubular member, and the third tubular member movably inserted into the second tubular member and a regulating device that regulates movement of the third tubular member with respect to the second tubular member. The regulating device includes a regulating member protruding from the inner hole portion to the outside of the third tubular member band is brought in the outer hole portion, and a pressing member for pressing the regulating member in the protruding direction.

1 Claim, 10 Drawing Sheets

FOREIGN PATENT DOCUMENTS

| | | |
|---|---|---|
| JP | 57-075511 U | 5/1982 |
| JP | 02-035200 B2 | 8/1990 |
| JP | 3066518 U | 2/2000 |
| WO | 9741383 A1 | 11/1997 |

OTHER PUBLICATIONS

Extended European Search Report for EP08722317.8 mailed Nov. 20, 2009.

* cited by examiner

EXTENSION DEVICE AND TRIPOD

This is a U.S. national phase application under 35 U.S.C. §371 of International Patent Application No. PCT/JP2008/054923 filed Mar. 18, 2008, and claims the benefit of Japanese Application No. 2007-070475, filed Mar. 19, 2007. The International Application has not been published at the time of this filing. The contents of both are incorporated herein in their entirety.

TECHNICAL FIELD

The present invention relates to an extension device and a tripod for which advantageous productivity is secured and production costs can be reduced.

BACKGROUND ART

Conventionally, for example, extension devices shown in FIG. 12 and FIG. 13 have been known as an extension device for a tripod leg apparatus (For example, refer to [online] Velbon Kabushiki Kaisha (retrieved on Feb. 28, 2007), Internet <URL: http://www.velbon.com/jp/catalog/classic/t100.html>.

An extension device shown in FIG. 12 and FIG. 13 is provided with a cylindrical upside tubular member 1 having an inner projection portion 1a for stopping fall-out, which protrudes inwardly at the lower end part thereof, a downside tubular member 2 having an outer projection portion 2a for stopping fall-out, that is, vertically movably inserted into the upside tubular member 1 along the axial direction thereof, protrudes outwardly at the upper end part, and is brought into contact with the fall-out stopping inner projection portion 1a of the upside tubular member 1 when protruded to the maximum with respect to the upside tubular member 1, and regulating means 3 such as locking means, which is secured at the upper end part of the downside tubular member 2 and regulates upward movement with respect to the upside tubular member 1.

And, the regulating means 3 has a pair of regulating members 5 such as dowels, which move outwardly in the diametrical direction by a pressing force of a pressing member 4 such as a compression spring, protrudes from the downside tubular member 2 from a hole portion 2b, and regulates upward movement of the downside tubular member 2 with respect to the upside tubular member 1 by being brought into contact with the lower end part of the upside tubular member 1.

Further, either one of the upside tubular member 1 or the downside tubular member 2 is made of brass, the thickness of which is 0.25 mm. Also, since the inner dimensions of parts other than the fall-out stopping inner projection portion 1a of the upside tubular member 1 are slightly greater than the outer dimensions of parts other than the fall-out stopping outer projection portion 2a of the downside tubular member 2, there is clearance between the upside tubular member 1 and the downside tubular member 2.

SUMMARY OF THE INVENTION

However, since, with the above-described configuration, it is necessary to form the fall-out stopping inner projection portion 1a at the lower end part of the upside tubular member 1 and to form the fall-out stopping outer projection portion 2a at the upper end part of the downside tubular member 2, it is troublesome to produce the tubular members 1 and 2.

The present invention has been developed in view of the above-described point, and it is therefore an object of the invention to provide an extension device and a tripod for which advantageous productivity is secured and production costs can be reduced.

An extension device according to the invention includes a first tubular member, a second tubular member movably inserted into the first tubular member along the axial direction, a third tubular member movably inserted into the second tubular member along the axial direction, and regulating means for regulating movement of the third tubular member with respect to the second tubular member, wherein the second tubular member has an outer hole portion, the third tubular member has an inner hole portion facing the outer hole portion, and the regulating means has a regulating member protruding from the inner hole portion to the outside of the third tubular member by movement toward the protrusion direction and a pressing member for pressing the regulating member toward the protrusion direction, the regulating member protrudes from the inner hole portion by movement in the protrusion direction based on the pressing force of the pressing member when the inner hole portion of the third tubular member is faced to the outer hole portion of the second tubular member by an extending motion of the extension device, and the regulating member is brought in the outer hole portion, movement of the third tubular member with respect to the second tubular member is regulated by engagement of the regulating member brought in, which is in a protruded state, with the circumferential edge of the outer hole portion of the second tubular member, and, when the regulating member in the protruded state is brought into contact with the end part in the axial direction of the first tubular member during the course of a contracting motion of the extension device, the regulating member is caused to escape from the outer hole portion by further movement in the non-protruding direction based on the pressing by the circumferential edge of the outer hole portion of the second tubular member after the regulating member moves in the non-protruding direction by the pressing based on the end part in the axial direction of the first tubular member.

The extension device according to an aspect of the invention is featured, in addition to the extension device above in that the regulating member has, at the tip end side thereof, a regulating portion that is brought in the outer hole portion from the point of time when the entire inner hole portion of the third tubular member is faced to the outer hole portion of the second tubular member.

The extension device according to another aspect of the invention is featured, in addition to the extension devices above in the regulating portion of the regulating member, in that a plane to be pressed, which is gradually brought in the outer hole portion of the second tubular member in line with movement of the third tubular member with respect to the second tubular member, is formed to become an inclined plane from one end of the tip end side to the other end of the tip end side.

A tripod according to the invention is provided with a base portion and three extension devices, which are rotatably attached to the base portion, according to any one of the first aspect through the third aspect above.

According to the present invention, since it is not necessary to form a fall-out stopping inner projection portion at the second tubular member and a fall-out stopping outer projection portion at the third tubular member, the productivity thereof is advantageous, and the production costs thereof can be reduced.

DETAILED DESCRIPTION OF THE INVENTION

A description is given of an embodiment of the present invention with reference to the drawings.

Figure 1:
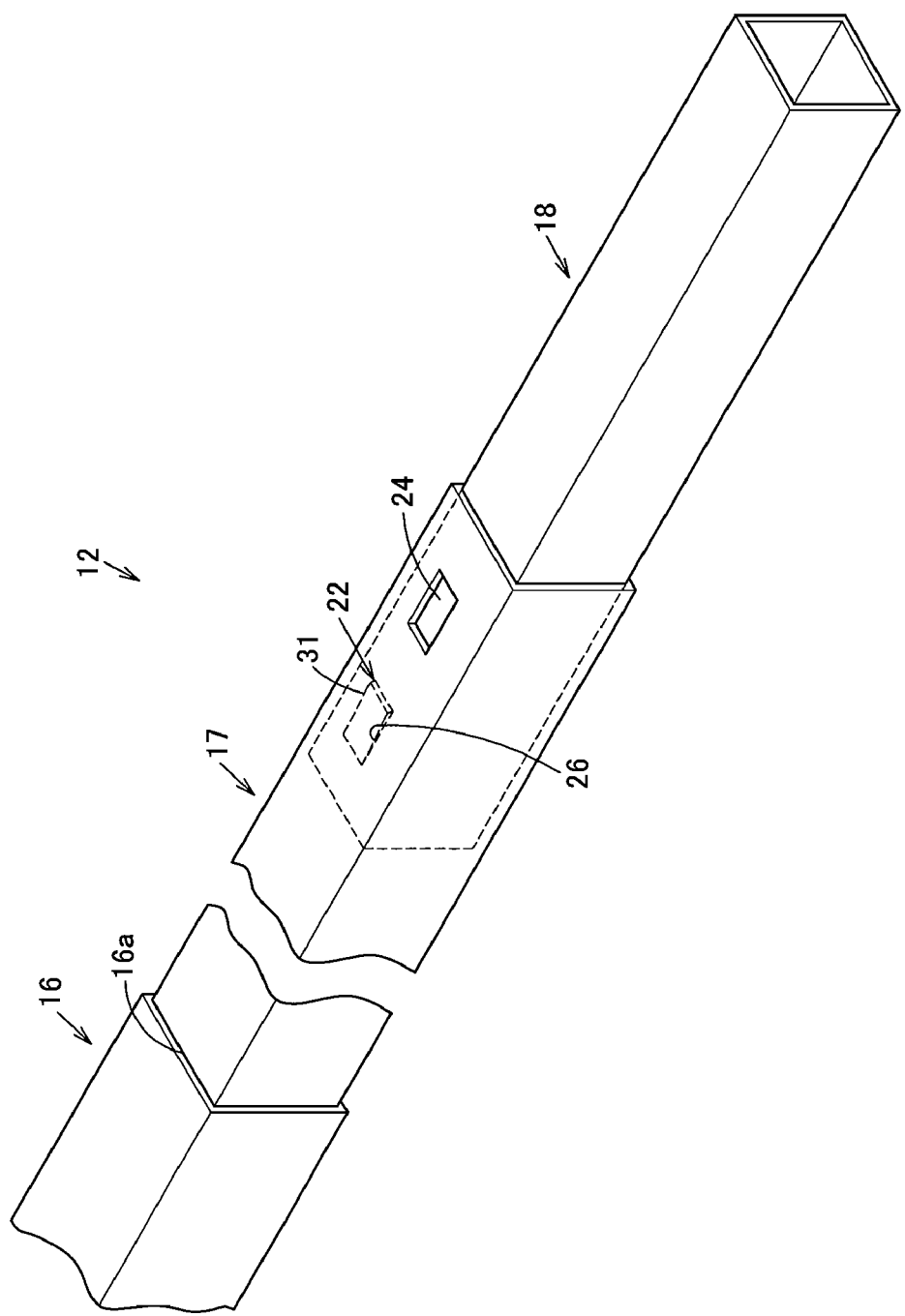
FIG. 1 is a partial perspective view showing an extension device according to an embodiment of the present invention.
Figure 2:
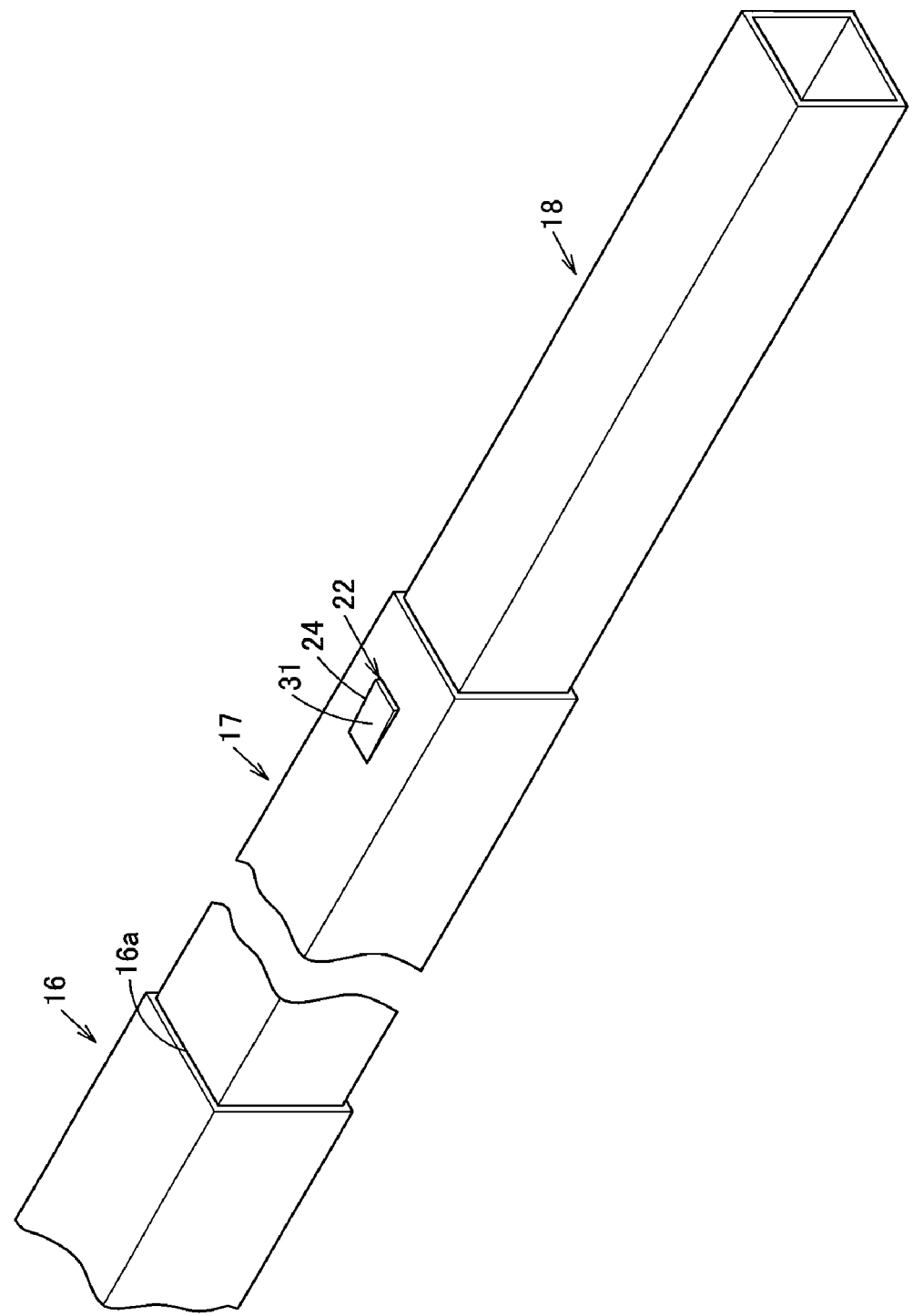
FIG. 2 is a partial perspective view of the same extension device.
Figure 3:
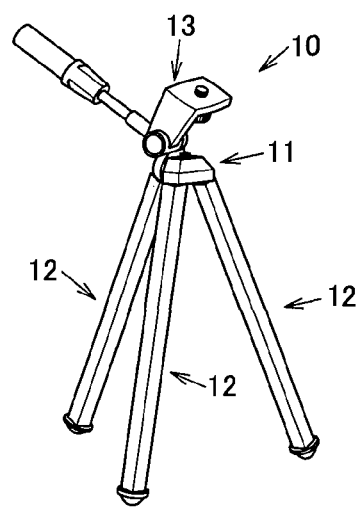
FIG. 3 is a schematic perspective view showing a tripod equipped with the device of FIG. 1, in the non-extended state.

In FIG. 3, reference numeral 10 denotes a tripod that is provided with a base portion 11. Extension devices 12 that are three long leg devices so as to extend and contract along the lengthwise direction are rotatably attached to the base portion 11. The respective extension devices 12 are composed of a multiple-stage type, for example, a three-stage type, and each of which has the same configuration. Also, a panhead 13 to which a camera, etc., is attached is mounted on the base portion 11. In addition, the following description is given based on the assumption that the extension direction (that is, the extension and contraction direction) of the extension devices 12 is an up and down direction.

As shown in FIG. 1, FIG. 2, and FIG. 4 through FIG. 11, the extension device 12 is provided with a plurality of cylindrical tubular members, for example, three tubular members 16, 17 and 18 that do not have any projections and recesses for stopping fall-out. That is, the extension device 12 includes the first tubular member 16 the top end part of which is rotatably coupled to the base portion 11 via a linkage member 15, the second tubular member 17, that is, vertically movably fitted and inserted into the first tubular member 16 along the axial direction of the first tubular member 16, and the third tubular member 18, that is, vertically movably fitted and inserted into the second tubular member 17 along the axial direction of the second tubular member 17. A butt end 19 that is a tip end member is attached to the lower end part of the third tubular member 18.

Further, the tubular members 16, 17 and 18 are formed to be slender and polygonally tubular with the same cross-sectional shape all over the full length thereof and to be open at both ends thereof, that is, for example, formed to be thin, slender and square-tubular so that the cross-sectional shape forms a square being a quadrangle. Also, the tubular members 16, 17 and 18 are made of aluminum, and the thickness of a pipe, which is the thickness dimension, is 0.35 mm through 0.4 mm. Further, the inner dimensions of the tubular members 16 and 17 of the tubular members 16, 17 and 18, which are adjacent to each other, are approximately identical to the outer dimensions of the other tubular members 17 and 18 thereof, wherein there is almost no clearance between the respective tubular members 16, 17 and 18 which are adjacent to each other.

Also, the extension device 12 includes the first regulating means 21 such as locking means, etc., which is secured at the upper end part of the second tubular member 17 and regulates movement, that is, up and down movements of the second tubular member 17 with respect to the first tubular member 16 along the axial direction, and the second regulating means 22 such as locking means, etc., which is secured at the upper end part of the third tubular member 18 and regulates movement, that is, up and down movements of the third tubular member 18 with respect to the second tubular member 17 along the axial direction.

Here, a pair of rectangular outer hole portions 23 and 24 mutually faced apart from each other are formed in the lower end part of the first tubular member 16 and the lower end part of the second tubular member 17 so as to pass through each other. Also, a pair of rectangular inner hole portions 25 and 26 mutually faced apart from each other are formed in the upper end part of the second tubular member 17 and the upper end part of the third tubular member 18 so as to pass through each other. The outer hole portions 23, 24 and the inner hole portions 25, 26 have the same shape, respectively. And, as shown in FIG. 7, etc., the entire inner hole portion 25 at the upper end part of the second tubular member 17 is faced to the entire outer hole portion 23 of the lower end part of the first tubular member 16 in a state where the second tubular member 17 protrudes to the first tubular member 16 to the maximum, and the entire inner hole portion 26 at the upper end part of the third tubular member 18 is faced to the entire outer hole portion 24 at the lower end part of the second tubular member 17 in a state where the third tubular member 18 protrudes to the second tubular member 17 to the maximum.

Further, the second regulating means 22 that is regulating means includes a pair of regulating members 31 such as dowels movable and mutually faced apart from each other in the protruding direction A and the non-protruding direction B, which are the horizontal direction orthogonal to the axial direction (the extension direction of the extension device 12) of the third tubular member 18, and a pressing member 33 such as a compression spring, which is disposed between both the regulating members 31 and presses the respective regulating members 31 toward the protruding directions A being different directions.

Figure 7:
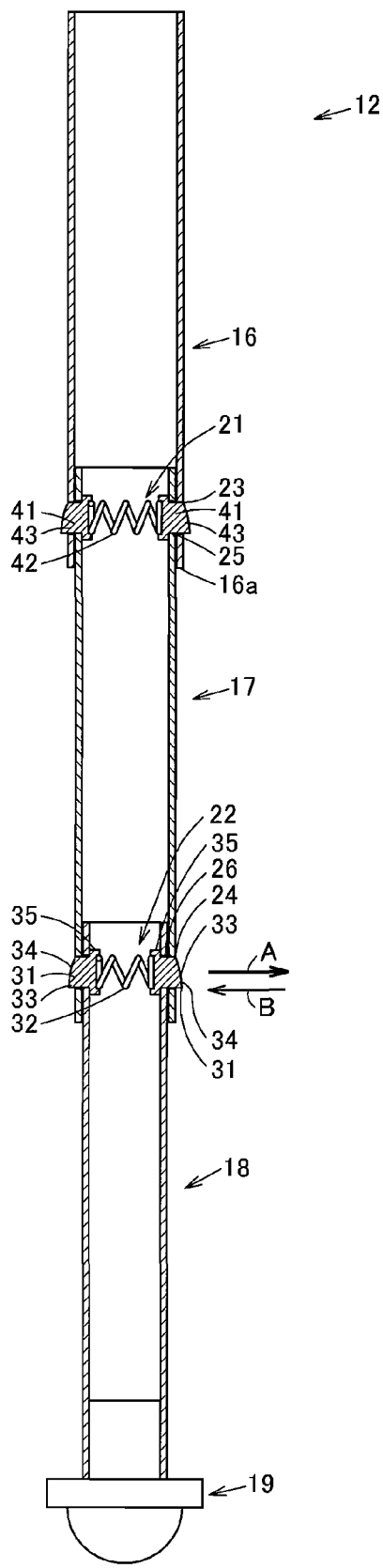
FIG. 7 is a sectional view showing an extended state of the same extension device.

And, as shown in FIG. 7, etc., in a state where the third tubular member 18 protrudes to the second tubular member 17 to the maximum, both the regulating members 31 protrude from the inner hole portion 26 of the third tubular member 18 to the outside of the third tubular member 18 by movement in the protruding direction A based on the pressing force of the pressing member 32, and is brought in the outer hole portion 24 of the second tubular member 17. Based on the regulating portion 33 at the tip end part of the regulating member 31, in a protruded state where the regulating member 31 is brought in the outer hole portion 24, being engaged with the circumferential edge of the outer hole portion 24 of the second tubular member 17, movement of the third tubular member 18 with the second tubular member 17 in the axial direction, that is, an up and down movement thereof is regulated. The tip end part of the regulating member 31 in the protruded state is projected from the outer hole portion 24 of the second tubular member 17 to the outside of the second tubular member 17 and is exposed outwardly.

Figure 4:
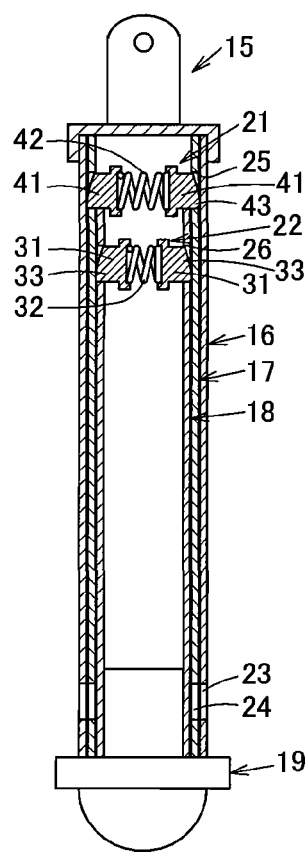
FIG. 4 is a sectional view showing a contracted state of the same extension device.

On the other hand, as shown in FIG. 4, etc., in a state where the entirety of the third tubular member 18 is accommodated in the second tubular member 17, both the regulating members 31 do not protrude from the third tubular member 18 and are positioned in the third tubular member 18. That is, the tip end part of the regulating member 31 is pressed by the pressing member 32 and is positioned in the inner hole portion 26 of the third tubular member 18 in a state where it is brought into contact with the inside of the second tubular member 17.

Further, the respective regulating members 31 have a regulating portion 33, which is positioned at the tip end side, gradually brought in the outer hole portion 24 in line with downward movement of the third tubular member 18 with respect to the second tubular member 17 from the point of time when the entire inner hole portion 26 of the third tubular member 18 is faced to the entire outer hole portion 24 of the second tubular member 17 at the time of downward movement of the third tubular member 18 with respect to the second tubular member 17 in an extending motion of the extension device 12. At the regulating portion 33, a plane 34 to be pressed, which is gradually brought in the outer hole portion 24 of the second tubular member 17 in line with downward movement of the third tubular member 18 with respect to the second tubular member 17 is formed so as to become an inclined surface with respect to the axial direction (the direction orthogonal to the movement direction) of the third tubular member 18 from the lower end being one end of the tip end side to the upper end being the other end of the tip end side. That is, the tip end side of the regulating member 31 is formed to be a surface gradually inclined outwardly from the upper edge to the lower edge, and is composed of a plane 34 to be pressed, which has a slightly convex-curved profile outwardly. In addition, the protruding direction dimension L between upper end and lower end with respect to the plane 34 to be pressed is longer than the thickness dimension of the second tubular member 17 (See FIG. 10).

Further, the respective regulating members 31 have a pressing member receiver 35, the cross sectional shape of which is roughly channel-shaped, at the proximal side thereof. One end portion of the pressing member 32 is fitted to the pressing member receiver 35 of one regulating member 31 and the other end portion of the pressing member 32 is fitted to the pressing member receiver 35 of the other regulating member 31. Since the shape of the pressing member receiver 35 is greater than the shape of the inner hole portion 26, there is no case where the regulating member 31 is brought out of the third tubular member 18 by the pressing member receiver 35 being brought into contact with the circumferential edge inner surface of the inner hole portion 26 of the third tubular member 18.

On the other hand, the first regulating means 21 includes a pair of regulating members 41 such as dowels, which are movable and mutually faced apart from each other in the protruding direction A and the non-protruding direction B, which are the horizontal directions orthogonal to the axial direction of the second tubular member 17 and a pressing member 42 such as a compression spring, which is disposed between both the regulating members 41 and presses the respective regulating members 41 in the protruding directions A being different directions as in the second regulating means 22. The length direction of the pressing member 42 is made shorter than the length dimension of the pressing member 32 of the second regulating means 22.

And, as shown in FIG. 7, etc., in a state where the second tubular member 17 protrudes to the first tubular member 16 to the maximum, both the regulating members 41 protrude from the inner hole portion 25 of the second tubular member 17 to the outside of the second tubular member 17 by movement of the pressing member 42 into the protruding direction A based on the pressing force and are brought in the outer hole portion 23 of the first tubular member 16. Movement of the second tubular member 17 with respect to the first tubular member 16 in the axial direction, that is, the up and down movement thereof is regulated since the regulating portion 43 of the tip end part of the regulating member 41 in the protruded state where the regulating members 41 are brought in the outer hole portion 23 is engaged with the circumferential edge of the outer hole portion 23 of the first tubular member 16.

On the other hand, as shown in FIG. 4, etc., in a state where the entirety of the second tubular member 17 is accommodated in the first tubular member 16, both the regulating members 41 do not protrude from the second tubular member 17, and are positioned in the second tubular member 17. That is, the tip end portion of the regulating member 41 is positioned in the inner hole portion 25 of the second tubular member 17 in a state where the tip end portion is pressed by the pressing member 42 and is in contact with the inside of the first tubular member 16.

Also, the respective regulating members 41 have, at the tip end side thereof, a regulating portion 43 gradually brought in the outer hole portion 23 in line with downward movement of the second tubular member 17 with respect to the first tubular member 16 from the point of time when the entire inner hole portion 25 of the second tubular member 17 is faced to the entire outer hole portion 23 of the first tubular member 16 at the time of downward movement of the second tubular member 17 with respect to the first tubular member 16 when the extension device 12 extends. At the regulating portion 43, the plane 44 to be pressed, which is gradually brought in the outer hole portion 23 of the first tubular member 16 in line with downward movement of the second tubular member 17 with respect to the first tubular member 16 is formed to be an inclined plane with respect to the axial direction (the direction orthogonal to the movement direction) of the second tubular member 17 from the lower end being one end of the tip end side to the upper end being the other end of the tip end side. That is, the tip end side of the regulating member 41 is formed to be a surface gradually inclined outwardly from the upper edge to the lower edge, and is composed of a plane 44 to be pressed, which has a convex-curved profile outwardly.

In addition, both the regulating members 41 are covered with a covering member (not illustrated), the plane 44 to be pressed is pressed by operations of operating means such as an operating lever, etc., attached to the covering member, whereby the plane 44 to be pressed can move regulating members 41 in the non-protruding direction B. Also, the plane 44 to be pressed of the regulating member 41 may be composed so that it is directly pushed by fingers without the covering member and the operating means provided.

In addition, the respective regulating members 41 have a pressing member receiver 45, the cross-sectional shape of which is roughly channel-shaped, at the proximal side thereof. One end portion of the pressing member 42 is fitted to the pressing member receiver 45 of one regulating member 41, and the other end portion of the pressing member 42 is fitted to the pressing member receiver 45 of the other regulating member 41. Since the shape of the pressing member receiver 45 is greater than the shape of the inner hole portion 25, the regulating member 41 is prevented from falling out from the second tubular member 17 by contact of the pressing member receiver 45 with the inside of the circumferential edge of the inner hole portion 25 of the second tubular member 17.

Next, a description is given of operations, etc., of the above-described tripod 10.

Where the extension device 12 being a leg device is extended when using the tripod 10, a user pulls out the second tubular member 17 from an accommodated state, where the extension device is contracted as shown in FIG. 4, in the first tubular member 16 while holding the butt end 19 at the lower end portion of the extension device 12, and pulls out the third tubular member 18 from the second tubular member 17. That is, the second tubular member 17 is moved downward with respect to the first tubular member 16, and at the same time the third tubular member 18 is moved downward with respect to the second tubular member 17.

Figure 5:
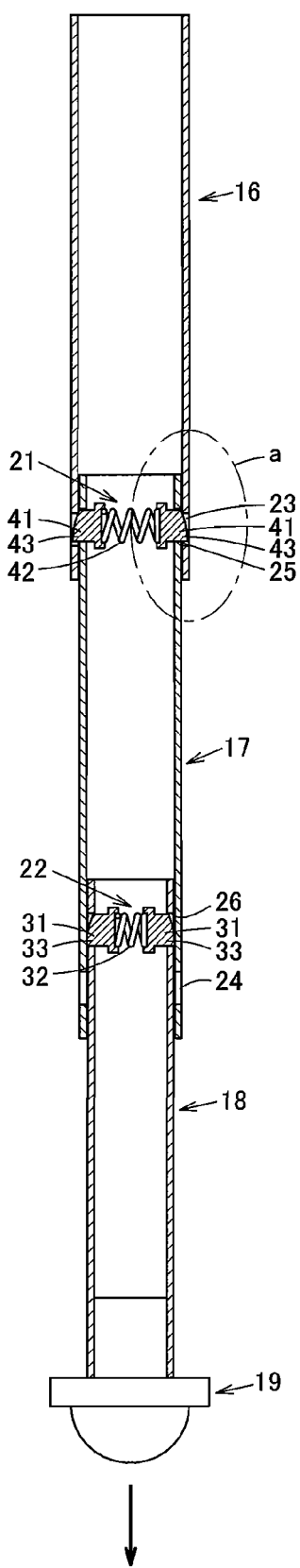
FIG. 5 is a sectional view showing an extending motion of the same extension device.

Although FIG. 5 shows an extending state (an extending state where the legs are being extended) of the extension device 12, the regulating portion 43 of the regulating member 41 of the first regulating means 21 is moved in the protruding direction A by pressing of the pressing member 42 during the course of an extending motion, and is brought in the outer hole portion 23 of the first tubular member 16, where the second tubular member 17 is entered into a locked state with respect to the first tubular member 16. After that, as the extension device 12 is extended to the maximum, the regulating portion 33 of the regulating member 31 of the second regulating means 22 is moved in the protruding direction A by pressing of the pressing member 32, and is brought in the outer hole portion 24 of the second tubular member 17, wherein the third tubular member 18 is entered into a locked state with the second tubular member 17 (See FIG. 7).

Figure 6:
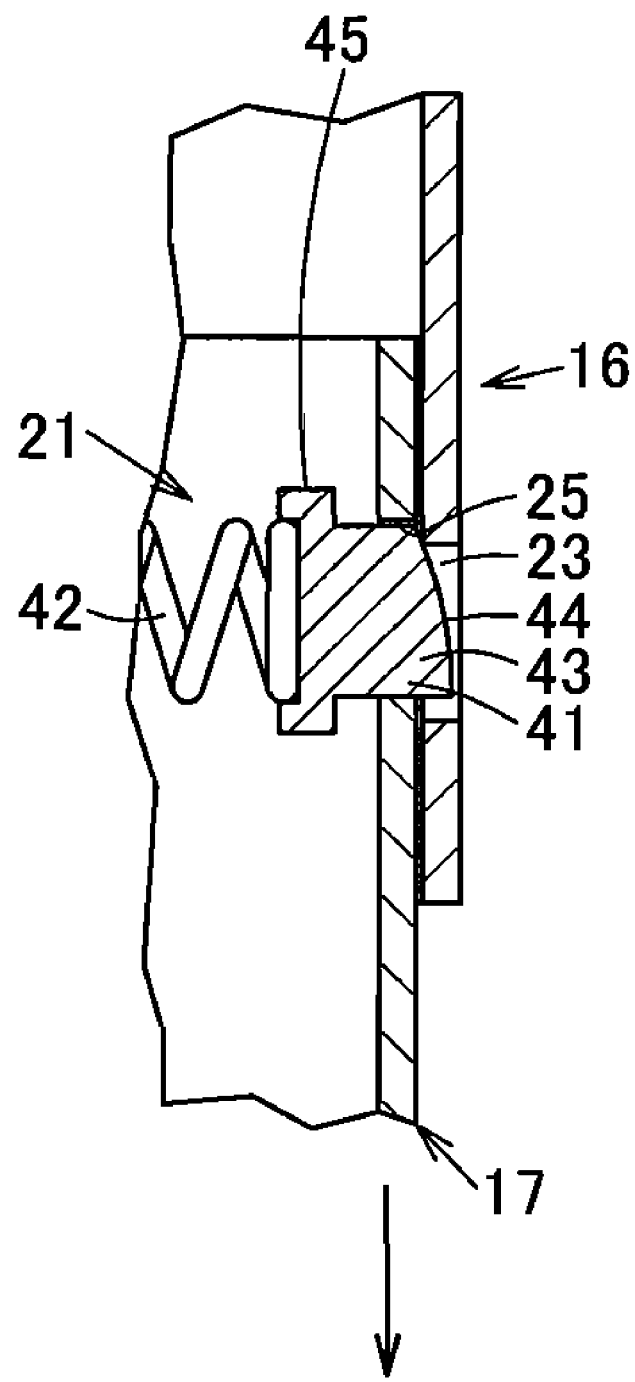
FIG. 6 is an enlarged sectional view showing portion "a" in FIG. 5.

As shown in FIG. 6, since, in the extending motion of the extension device 12, the regulating portion 43 of the regulating member 41 is brought in the outer hole portion 23 of the first tubular member 16 from the point of time when the entire inner hole portion 25 of the second tubular member 17 is faced to the entire outer hole portion 23 of the first tubular member 16, there is no case where the second tubular member 17 falls out from the interior of the first tubular member 16 by the regulating portion 43 failing to enter the outer hole portion 23. Also, similarly, since the regulating portion 33 of the regulating member 31 is brought in the outer hole portion 24 of the second tubular member 17 from the point of time when the entire inner hole portion 26 of the third tubular member 18 is faced to the entire outer hole portion 24 of the second tubular member 17, there is no case where the third tubular member 18 falls out from the interior of the second tubular member 17 by the regulating portion 33 failing to enter the outer hole portion 24.

On the other hand, where the extension device 12 is contracted after use of the tripod 10, a user first operates the operating means such as an operation lever (not illustrated) in an extended state shown in FIG. 7, moves the regulating member 41 in the non-protruding direction B and causes the regulating member 41 to escape from the outer hole portion 23 of the first tubular member 16, and releases the locking of the second tubular member 17 with respect to the first tubular member 16, that is, causes upward movement of the second tubular member 17 to be permitted with respect to the first tubular member 16. And, the user presses the butt end 19 of the lower end part of the extension device 12, and the second tubular member 17 moved upward with respect to the first tubular member 16.

Figure 8:
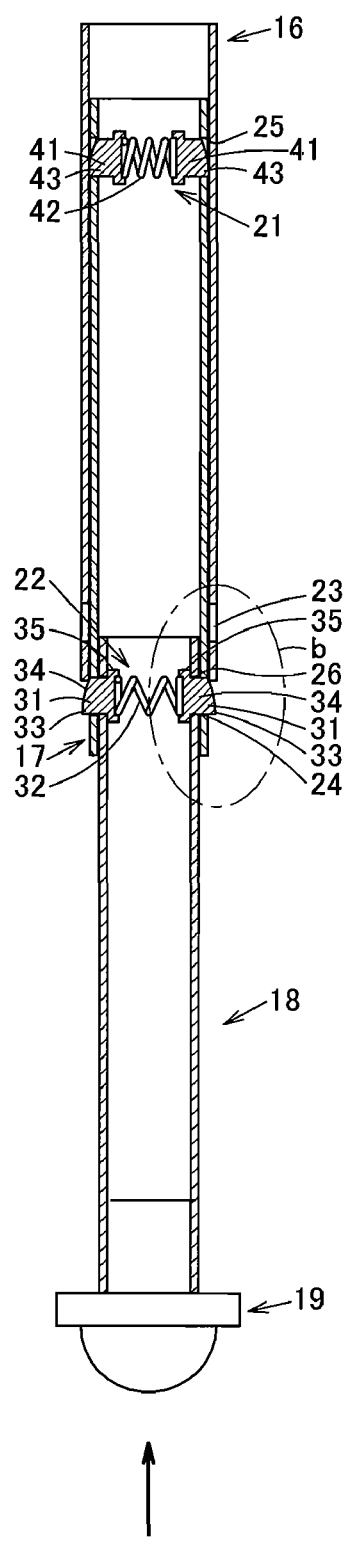
FIG. 8 is a sectional view showing a contracting motion during the course of a contracting motion of the same extension device.
Figure 9:
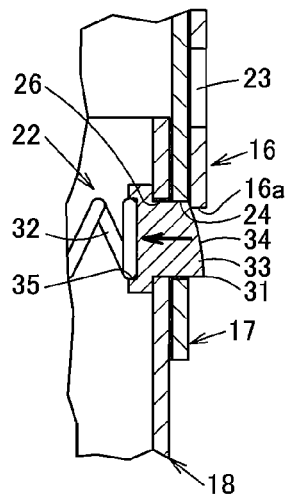
FIG. 9 is an enlarged sectional view showing portion "b" in FIG. 8.
Figure 10:
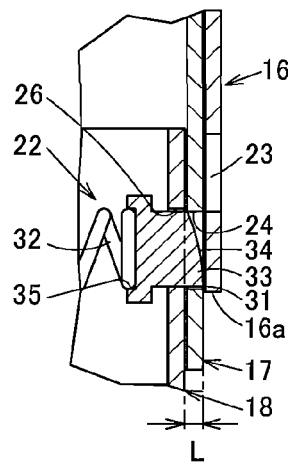
FIG. 10 is an enlarged sectional view showing a state immediately before the plane, to be pressed, of the regulating member pressed by the circumferential edge of the outer hole portion of the second tubular member.
Figure 11:
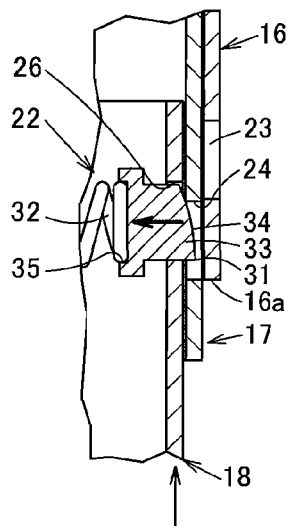
FIG. 11 is an enlarged sectional view showing a state that the plane, to be pressed, of the regulating member pressed and moved by the circumferential edge of the outer hole portion of the second tubular member.
Figure 12:
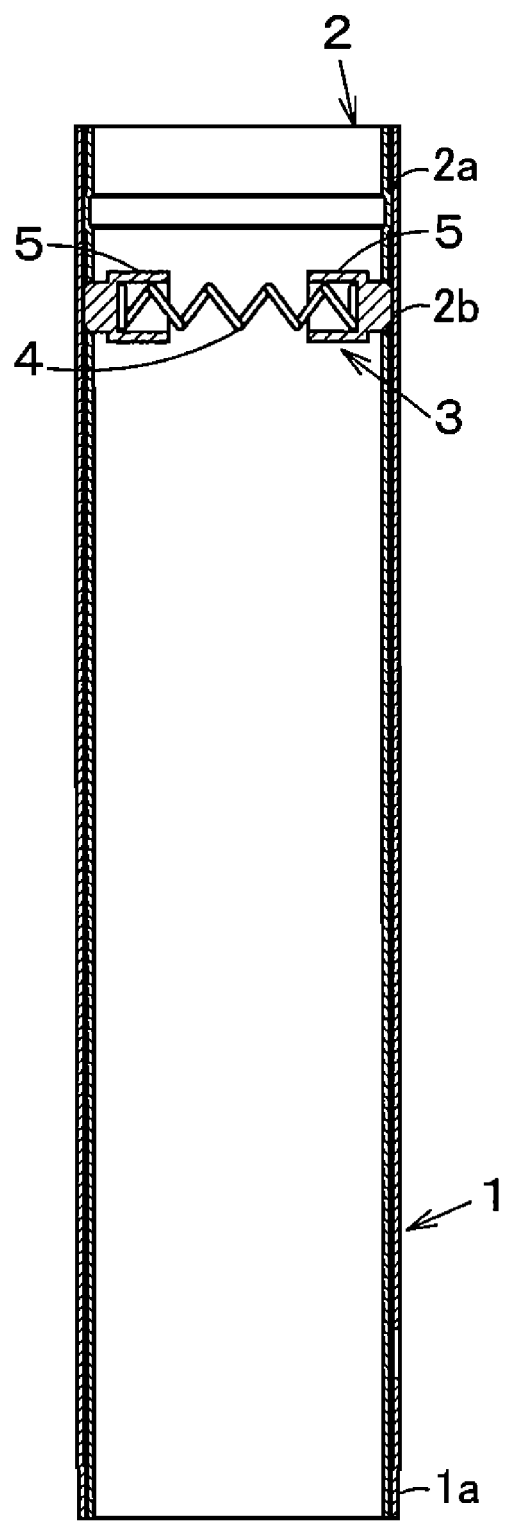
FIG. 12 is a sectional view showing a contracted state of a related art extension device.
Figure 13:
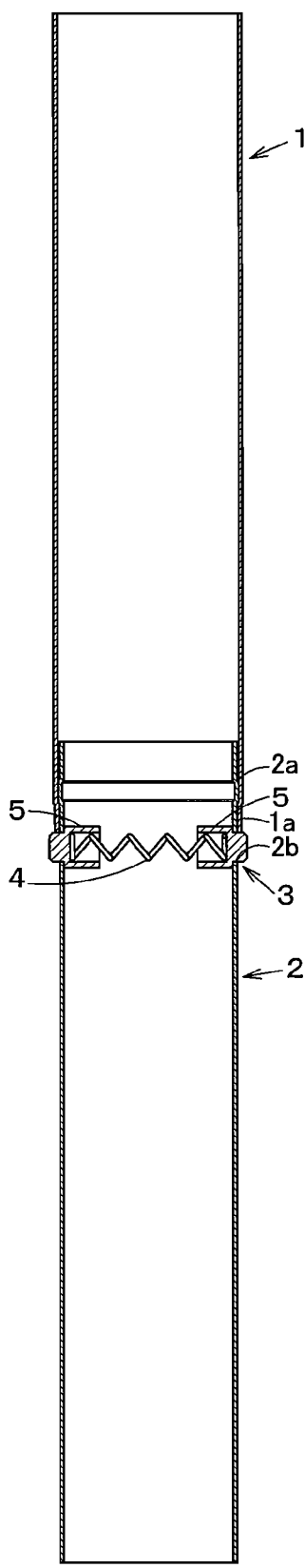
FIG. 13 is a sectional view showing an extended state of the same related art extension device.

Although FIG. 8 shows a contracting motion (motion of leg contraction) of the extension device 12, during the course of a contracting motion, when, as shown in FIG. 9 through FIG. 11, the protruded regulating member 31 of the second regulating means 22 is brought into contact with the end part 16a in the axial direction of the first tubular member 16, the regulating member 31 is moved in the non-protruding direction B by pressing by means of the end part 16a in the axial direction of the first tubular member 16. After that, the regulating member 31 is caused to escape from the outer hole portion 24 of the second tubular member 17 by further movement of the second tubular member 17 in the non-protruding direction B based on pressing by the circumferential edge of the outer hole portion 24 of the second tubular member 17. As a result, locking of the third tubular member 18 with respect to the second tubular member 17 is released, that is, upward movement of the third tubular member 18 with respect to the second tubular member 17 is permitted, wherein the extension device 12 is entered into an accommodated state as shown in FIG. 4.

That is, as shown in FIG. 9, as the plane 34, to be pressed, of the protruded regulating member 31 is brought into contact with the end part 16a in the axial direction of the first tubular member 16, the pressed plane 34 is pressed at the end part 16a in the axial direction of the first tubular member 16 based on the upward movement of the second tubular member 17 and the third tubular member 18 with respect to the first tubular member 16, wherein the regulating member 31 is moved in the non-protruding direction B against pressing of the pressing member 32.

Subsequently, as shown in FIG. 10, as the end part 16a in the axial direction of the first tubular member 16 is separated from the pressed plane 34 of the regulating member 31, this time, the pressed plane 34 of the regulating member 31 is pressed by the circumferential edge of the outer hole portion 24 of the second tubular member 17 based on the upward movement of the third tubular member 18 with respect to the second tubular member 17, wherein the regulating member 31 is further moved in the non-protruding direction B against pressing of the pressing member 32, the regulating portion 33 of the regulating member 31 is caused to escape from the outer hole portion 24 of the second tubular member 17, and thus locking of the third tubular member 18 with respect to the second tubular member 17 is released.

Thus, according to the extension device 12, as the inner hole portion 26 of the third tubular member 18 is faced to the outer hole portion 24 of the second tubular member 17 by an extending motion of the extension device 12, the regulating member 31 protrudes from the inner hole portion 26 to the outside of the third tubular member 18 by movement of the regulating member 31 in the protruding direction A based on the pressing force of the pressing member 32, and is brought in the outer hole portion 24, wherein movement of the third tubular member 18 with respect to the second tubular member 17 in the axial direction is regulated by the regulating member 31, which is brought in and protruded, being engaged with the circumferential edge of the outer hole portion 24 of the second tubular member 17. On the other hand, the regulating member 31 is composed so that, as the protruded regulating member 31 is brought into contact with the end part 16a in the axial direction of the first tubular member 16 during the course of a contracting motion of the extension device 12, the regulating member 31 is caused to escape from the outer hole portion 24 by further movement in the non-protruding direction B based on pressing by the circumferential edge of the outer hole portion 24 of the second tubular member 17 after it moves in the non-protruding direction B by pressing based on the end part 16a in the axial direction of the first tubular member 16. Therefore, since it is not necessary to form a fall-out stopping projection at the second tubular member 17 or to form a fall-out stopping projection at the third tubular portion 18, expert craftsmanship is not required, and the tubular members 16, 17 and 18 can be easily produced, wherein productivity thereof is advantageous and production costs can be reduced. Furthermore, there is no disadvantage in that aluminum is used as the material of the tubular members 16, 17 and 18, and a light and tough extension device 12 can be brought about.

In addition, at the regulating portion 33 of the regulating member 31, a plane 34 to be pressed, which is gradually brought in the outer hole portion 24 in line with movement of the third tubular member 18 with respect to the second tubular member 17 is formed to be an inclined surface from one end of the tip end side of the regulating member 31 to the other end of the tip end side thereof, and at the regulating portion 43 of the regulating member 41, a plane 44 to be pressed, which is gradually brought in the outer hole portion 23 in line with movement of the second tubular member 17 with respect to the first tubular member 16 is formed to be an inclined surface from one end of the tip end side of the regulating member 41 to the other end of the tip end side thereof. Therefore, it is possible to appropriately prevent the third tubular member 18 from falling out from the second tubular member 17 and appropriately prevent the second tubular member 17 from falling out from the first tubular member 16.

Also, the extension device 12 is not limited to a three-stage type having three tubular members 16, 17 and 18. It may be composed to be, for example, a two-stage type or a four-stage type, etc.

In addition, although a description was given of a case where the extension device 12 is used as a leg device of the tripod 10, it may be applicable to other stand devices, etc.

Further, the regulating means 22 is not limited to a configuration having a pair of regulating members 31. The regulating means 22 may be composed so as to have only a regulating member 31 at any single side.

INDUSTRIAL APPLICABILITY

The present invention may be utilized for, for example, a leg device such as a tripod and other stand devices, etc.

The invention claimed is:

1. An extension device comprising:
a first tubular member;
a second tubular member movably inserted into the first tubular member along an axial direction;
a third tubular member movably inserted into the second tubular member along the axial direction; and
a regulating device regulates movement of the third tubular member with respect to the second tubular member;
wherein:
the second tubular member has an outer hole portion;
the third tubular member has an inner hole portion facing the outer hole portion; and
the regulating device includes:
a regulating member protruding from the inner hole portion to an outside of the third tubular member which is brought in the outer hole portion by movement toward a protrusion direction orthogonal to the axial direction of the third tubular member and caused to escape from the outer hole portion by movement in a non-protruding direction orthogonal to the axial direction of the third tubular member; and
a pressing member for pressing the regulating member toward the protrusion direction;
wherein the regulating member protrudes from the inner hole portion by movement in the protrusion direction based on a pressing force of the pressing member when the inner hole portion of the third tubular member is faced to the outer hole portion of the second tubular member by an extending motion of the extension device, and the regulating member is brought in the outer hole portion;
wherein movement of the third tubular member with respect to the second tubular member is regulated by the brought-in regulating member, which is in a protruded state, being engaged with a circumferential edge of the outer hole portion of the second tubular member;
wherein when the regulating member in a protruded state is brought into contact with an end part in the axial direction of the first tubular member during the course of a contracting motion of the extension device, the regulating member escapes from the outer hole portion by further movement in the non-protruding direction based on the pressing by the circumferential edge of the outer hole portion of the second tubular member after the regulating member moves in the non-protruding direction by pressing the end part in the axial direction of the first tubular member,
wherein the regulating member has, at a tip end side toward the protrusion direction, a regulating portion that is brought in the outer hole portion from the point of time when the entire inner hole portion of the third tubular member is faced to the outer hole portion of the second tubular member when the third tubular member moves downward with respect to the second tubular member,
wherein the regulating portion has, at the tip end side, a plane to be pressed which is brought into contact with the end part in the axial direction of the first tubular member and pressed at the end part in the axial direction of the first tubular member,
wherein the plane to be pressed, which is gradually brought in the outer hole portion of the second tubular member in line with the downward movement of the third tubular member with respect to the second tubular member, is formed to be a surface gradually inclined outwardly from the upper edge to the lower edge, and an inclined plane which has a slightly convex-curved profile outwardly in the regulating portion;
wherein the protruding direction dimension between the upper end and the lower end with respect to the plane to be pressed is longer than the thickness dimension of the second tubular member, and
wherein a corner portion between a lower face of the regulating portion and the plane to be pressed is angular.

* * * * *